April 6, 1971  J. F. ASKAM  3,574,025
METHOD OF MANUFACTURING PNEUMATIC TIRES
Filed Nov. 27, 1968
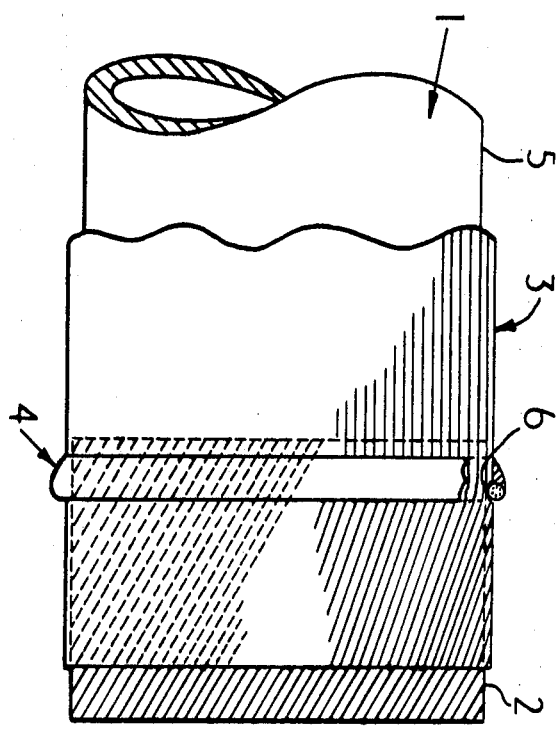

United States Patent Office 3,574,025
Patented Apr. 6, 1971

3,574,025
METHOD OF MANUFACTURING
PNEUMATIC TIRES
John F. Askam, Sutton Coldfield, England, assignor to
The Dunlop Company Limited, London, England
Filed Nov. 27, 1968, Ser. No. 779,390
Claims priority, application Great Britain, Dec. 1, 1967,
54,829/67
Int. Cl. B29h 17/22
U.S. Cl. 156—124                3 Claims

ABSTRACT OF THE DISCLOSURE

A method of preventing distortion of the turned-up portion of a 90° metal carcass ply in the manufacture of a pneumatic tire provided with a filler of bias laid metal cords comprising off-setting the cord ends of the carcass ply before turn-up to compensate for the distortion.

---

This invention relates to the manufacture of pneumatic tires.

In the manufacture of pneumatic truck tires incorporating plies of radially disposed rubberised steel cords and having fillers or chafers of similar cord material, in the bead regions of the tires, the steel cords of the fillers or chafers are disposed so as to make a substantial angle with respect to the radial cords of the plies. During turn-up of the plies around a bead wire there is a considerable amount of distortion caused by the interaction of one set of steel cords which are adhered by the cord rubberisation to the other crossing set of steel cords. More specifically, the ends of the radial steel cords, when they have been wrapped around the bead wire, no longer are disposed radially but can be distorted very substantially to be inclined at, for example, 10 to 20° to the radial direction.

It is an object of the present invention to reduce or eliminate the distortion caused in the conditions referred to.

According to the invention there is provided a method of manufacturing a pneumatic tire from rubberised metal cord reinforced plies comprising applying to a tire building drum a filler of bias-laid rubberised metal cords and a ply of rubberised metal cords disposed at substantially 90° to the mid-circumferential plane of the drum to form a cylinder disposed around the drum, applying a bead wire to the bead region of the ply overlying the filler, offsetting the 90° metal cords of the ply in a direction so as to lie in the same direction as that of the bias-laid cords of the filler but so as still to cross the filler cords and turning-up the ply and filler around the bead wire whereby upon turn-up the amount of ply cord offset and the interaction of the offset ply cords and the filler cords provides a turned-up ply of cords which are disposed substantially at 90° to the said plane.

Preferably the angle through which the 90° metal cords of the ply are offset corresponds to the angle of distortion which results upon turning up the ply and filler around the bead wire when no such offset is made. The angle of distortion which results when no such offset is made, can be measured on a photograph of the bead and lower sidewall region of the tire.

One embodiment of the invention will now be described in more detail with reference to the accompanying drawing which shows a diagrammatic fragmentary axial cross-sectional view of a carcass and filler strip positioned on a former according to the embodiment of the invention.

According to one embodiment of the invention a pneumatic truck tire is manufactured as follows:

Two fillers 2 each comprising a rubberised strip of steel cords disposed at 22° with respect to a circumferential line when the strip is mounted on the flat cylindrical surface 5 of a drum 1 are located in spaced-apart relationship on the said surface in positions where they each will be superposed by a ply 3 and by a bear wire 4.

A ply 3 of 90° rubberised steel cords is then laid onto the flat cylindrical drum surface 5 beyond the end of the building drum 1.

Bead wire assemblies 4 are disposed in superposed relationship upon the plies 3 and fillers 2, and the drum is expanded so that each bead wire will be located within a shallow groove 6 formed on the drum surface 5.

At each end of the drum 1 the radial cords are offset by an amount of 19° from their radial direction (i.e. a direction parallel to the rotational axis of the drum) in a direction in the same general sense as that of the cords of the filler. The angular offset of the ply cords is maintained from the portion of the ply on which each bead is seated to the ply end.

The filler and ply are then firmly adhered together by the rubberisation of the layers so that a uniform "trellising" action can take place during turn-up, and this operation is then carried out. The influence of the 22° steel filler cords upon the offset radial ply cords is such that, upon turn-up, the radial ply cords are restored from their offset disposition to a substantially radial disposition with the result that satisfactory performance of the bead region of the tire is obtained in confromity with the design considerations.

Having now described my invention, what I claim is:

1. A method of manufacturing a pneumatic tire from rubberised metal cord reinforced plies comprising applying to a tire building drum a filler of bias-laid rubberised metal cords and a ply of rubberised metal cords disposed at substantially 90° to the mid-circumferential plane of the drum to form a cylinder disposed around the drum, applying a bead wire to the tread region of the ply overlying the filler, off-setting the 90° metal cords of the ply in the portion of the ply which is to be turned-up around the bead, the offset being in a direction so as to lie in the same direction as that of the bias-laid cords of the filler but so as still to cross the filler cords and turning-up the ply and filler around the bead wire whereby upon turn-up the amount of ply cord offset and the interaction of the offset ply cords and the filler cords provides a turned-up ply of cords which are disposed substantially at 90° to the said plane.

2. A method according to claim 1 wherein the angle through which the 90° metal cords of the ply are offset corresponds substantially to the angle of distortion which results during ply turn-up when no offset is made.

3. A method according to claim 1 wherein the 90° metal cords of the ply are offset through an angle of 19° when the bias angle of the cords of the filler is 22° and when said filler and carcass are applied to a cylindrical tire building former.

References Cited

UNITED STATES PATENTS

| | | | |
|---|---|---|---|
| 2,700,998 | 2/1955 | Wallace | 156—132 |
| 2,703,128 | 3/1955 | Darrow | 156—124 |
| 3,374,131 | 3/1968 | Gough | 156—124 |
| 3,409,492 | 11/1968 | Yoe | 156—132 |

BENJAMIN A. BORCHELT, Primary Examiner

S. C. BENTLEY, Assistant Examiner

U.S. Cl. X.R.
156—132